3,320,218
CROSS-LINKED SULFONATED ALIPHATIC HYDROCARBON POLYMERS

Charles A. Levine, Concord, Calif., assignor to The Dow Chemical Company, Midland, Mich., a corporation of Delaware
No Drawing. Filed Apr. 5, 1963, Ser. No. 270,801
13 Claims. (Cl. 260—79.3)

This invention relates to sulfonated aliphatic hydrocarbon polymers cross-linked through sulfone groups, to a process for their preparation and to a process for their fabrication.

United States patent application, Serial No. 270,800, filed April 5, 1963, by William E. Skiens describes and claims a process for sulfonating aliphatic hydrocarbon polymers in which a solid aliphatic hydrocarbon polymer is swelled with a halogenated swelling agent such as methylene dichloride, sulfonated while in the swollen condition by reaction with an inorganic sulfur-containing acidic sulfonating agent such as chlorosulfonic acid, and washed, e.g. with a volatile organic compound such as acetone to remove the halogenated hydrocarbon and with water to remove water-soluble constituents; in instances where chlorosulfonic acid is used as sulfonating agent, the sulfonated aliphatic hydrocarbon polymer usually contains some chlorosulfonyl groups which are preferably hydrolyzed in an aqueous alkaline solution, such as a 10 percent by weight solution of sodium hydroxide in water or an aqueous acid solution to recover a sulfonated aliphatic hydrocarbon polymer having predominately sulfonic acid groups on the polymer chains thereof.

The aliphatic hydrocarbon polymers sulfonated as described above have many properties superior to those of the polymers themselves. Among these properties are a hydrophilic nature which renders the polymer receptive to organic coatings such as coating inks, dyes and the like, improved resistance to chemicals and, at least for the homogeneously sulfonated polymers, the ability to form a permselective barrier useful in electrochemical or electrodialytic processes, for example the desalting of the sea water or other brackish waters. However, these sulfonated polymers also have certain disadvantages which restrict their usefulness. For example, they tend to undergo undesirable distortion and elongation with varying moisture content, in the presence of liquids of varying ionic strength or at elevated temperatures and have relatively poor strength when in the form of film.

An object of this invention is to provide a cross-linked aliphatic hydrocarbon or sulfonated aliphatic hydrocarbon polymer of improved temperature stability, strength, resistance to elongation, and resistance to stress cracking when in fabricated form.

A further object is to provide a process for the preparation of cross-linked aliphatic hydrocarbon or sulfonated aliphatic hydrocarbon polymers which is simple and easy to carry out.

Another object is to provide an improved process for fabricating sulfonated aliphatic hydrocarbon polymers.

Various other objects, advantages and features of the invention will become apparent from the following detailed description.

The objects of this invention are attained by an improved method in which a solid aliphatic hydrocarbon polymer, e.g. a polymer of an aliphatic olefin, such as an α-olefin, is swelled with a liquid halogenated hydrocarbon swelling agent, sulfonated while in a swollen condition by reaction with an inorganic sulfur-containing acidic compound, washed with a reagent to remove the sulfonating agent and, if necessary, to hydrolyze any chlorosulfonyl groups and to provide a sulfonated polymer having predominately sulfonic acid groups on the polymer chains thereof, which sulfonated polymer is then heated to cause intermolecular or intramolecular reaction of some of the sulfonic acid groups and formation of sulfone cross-linkages in the resulting product.

The steps of one embodiment of the improved process are shown schematically as follows:

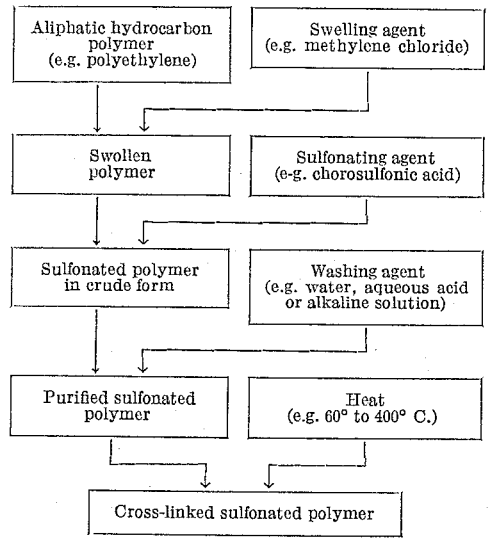

It was found that exposure of aliphatic hydrocarbon polymers, even in the form of thin films, directly to sulfonating agents followed by after treatment as described above resulted in sulfonation of mainly the surface of the polymer. The resulting product exhibited little permselectivity. However, when the polymer is swelled with a halogenated hydrocarbon swelling agent prior to sulfonation, sulfonation proceeds clear through the polymer article. The resulting fully sulfonated body is highly permselective.

The term "solid aliphatic hydrocarbon polymer" is used herein in the generic structural sense to mean an aliphatic polymer which is normally solid at ordinary room temperature and whose molecules contain long chains of carbon atoms attached to hydrogen atoms and including such chains which are further substituted with aliphatic side chains and groups such as halogen, oxygen, hydroxyl, hydrocarbon-oxy, carboxyl, aliphatic carboxylate, cyano, and the like. Among such solid aliphatic hydrocarbon polymers are the polymers of olefins, which are preferred, such as polymers of ethylene, propylene, butene-1, butene-2, and other monoethylenically unsaturated monomers having the general formula

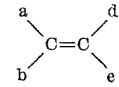

wherein at least one of $a$, $b$, $d$, and $e$ is hydrogen and the others are hydrogen, hydrocarbon, oxy, hydroxy, hydrocarbonoxy, halo, carboxyl, aliphatic carboxylate, cyano, etc. The terms "olefin polymer" and "polyolefins" likewise are intended to be structural, not necessarily historical, terms and include polymers having the structural characteristics of polymers of olefins, however they are prepared. Thus, the terms include, but are not limited to, polymers obtained by polymerization of ethylene, propylene, butene-1, vinyl chloride, etc. and also include polymers having such molecular structure from natural or synthetic means of preparation, such as polymethylene from diazomethane, hydrogenation of polymerized carbon monoxide, hydrogenation of polymerized butadiene or isoprene, chlorinated polyethylene, etc.

Suitable halogenated hydrocarbons include carbon tetrachloride, chloroform, methylene chloride, trichloroethane, perchloroethylene, tetrachloroethane, hexachloroethane, corresponding bromo compounds and the like or mixtures thereof. The swelling step may be carried out by exposing the polymer material to be treated to a suitable swelling agent for from about 0.01 to 2 or more hours at a temperature of from 0° C. to 100° C. It is generally preferred to employ elevated temperatures in the range of from 40° C. to 90° C. or higher so that swelling occurs relatively rapidly, i.e. in about 1 hour or less.

The sulfonation step may be carried out either by removing the swollen polymer from the swelling agent and placing the same in the sulfonating agent or a mixture of the sulfonating agent in the swelling agent, or by adding the sulfonating agent to the swelling polymer. Inorganic sulfur-containing acidic compounds useful as sulfonating agents include chlorosulfonic acid, sulfur trioxide, concentrated sulfuric acid containing at least about 98 percent by weight $H_2SO_4$, oleum or mixtures thereof.

Depending on the particular polymer employed, the complete sulfonation of aliphatic hydrocarbons can be carried out in the temperature range 0° to 100° C. For example, a low density branched polyethylene is suitably sulfonated at 25° to 50° C. A temperature of 40° to 80° C. is usually preferred to completely sulfonate higher density and linear polyethylene. The sulfonation reaction time may vary from 0.1 to 15 hours or more depending on the nature of the polymer and the number of sulfonic acid groups it is desired to put on a polymer unit. A preferred reaction time is 0.25 to 2 hours. The number of groups is generally in the range of 0.05 to 5 milliequivalents of —$SO_3H$ groups per gram of finished material. Below 0.05 meq./gram, the ion exchange capacity is too low to be useful as a permselective material and the material has lost most of its hydrophilic character while above 5 meq./gram, the sulfonated product becomes brittle and weak.

Following sulfonation, the polymer is removed from the sulfonation solution. If a halosulfonation agent such as chlorosulfonic acid has been used, the sulfonated polymer is preferably washed to hydrolyze any sulfuryl chloride groups to sulfonic acid groups. This washing step may be carried out with either water or an aqueous alkaline or acid solution. Suitable alkaline materials include sodium hydroxide, sodium carbonate, sodium bicarbonate, ammonium hydroxide and organic bases such as primary, secondary, tertiary amines or alcohol amines. Preferably, a 1 to 10 percent by weight solution of sodium hydroxide in water is employed. Suitable acids include the mineral acids such as hydrochloric acid and the lower carboxylic acids.

In accordance with this invention, the sulfonated polymer is cross-linked by heating. It is believed that heating such sulfonated polymers effects cross-linking by causing reaction of some of the sulfonic acid groups on the polymer with active hydrogen atoms elsewhere in the polymer chains splitting off water and forming sulfone linkages between polymer molecules.

The sulfonated polymer may be immersed in a liquid bath such as an aqueous mineral acid solution prior to heating or simply heated in an atmosphere of air or an inert gas such as nitrogen in an oven or other suitable heating chamber. There is an inverse time-temperature relationship for the cross-linking reaction. Generally, the higher the temperature employed the shorter the exposure time required for a given amount of cross-linking. Generally, the heating can be carried out at a temperature of from about 60° to about 400° C. for from about two hours to about one second.

The sulfonation step is generally carried out at temperatures below those used to effect cross-linking of the sulfonated polyolefin. As mentioned before, these ranges differ for different polyolefins. Infrared spectrographic analysis of a polymer sulfonated at 70° C. and washed, but given no further heat treatment following washing, showed almost complete absence of sulfone groups.

Sulfonated aliphatic hydrocarbons which are fabricated, such as by being heated so as to flow into a mold or the like, often form wrinkled or puckered products. This undesirable phenomenon is believed due to a partial cross-linking that occurs within the polymer during heating. However, if such sulfonated aliphatic hydrocarbon polymers are given an alkaline rinse as with diethylamine, trimethylamine, aqueous solution of sodium hydroxide or any other alkaline material such as those previously described prior to fabrication, a smooth article such as film can be produced which is free from wrinkling or puckering. This behavior is believed due to a temporary tying-up of the sulfonic acid groups of the polymer by the alkaline materials which retards cross-linking. Upon continued strong heating, the cross-linking reaction characteristic of this invention will occur regardless of the presence of the alkaline materials.

*Example 1*

A piece of polyethylene film 1.3 mils thick and weighing 0.35 gram was allowed to swell in 100 grams ethylene dichloride at 67° C. for 30 minutes. At the end of this time, 10 grams chlorosulfonic acid was added to make the solution approximately 10 percent by weight in chlorosulfonic acid and heating at 67° C. continued for 23 minutes to carry out sulfonation of the polymer. The sulfonated polymer was cooled to room temperature, washed with methylene dichloride and hydrolyzed by treating with a 10 percent by weight aqueous solution of sodium hydroxide for one hour. The polymer was next rinsed with water, reacidified by contact with 50 grams of a 6 M hydrochloric acid solution, washed again with water and allowed to dry. The treated film was cut into die sections having a thickness of 1.4 mils, a length of 3 inches, a width of 0.25 inch for 0.5 inch on either side of the center of the die flaring to a width of 0.75 inch. over the 0.75 inch segment of length at each end. The die sections were given various heat treatments and the elongation elasticity determined by hanging weights on a vertically suspended die section and measuring the change in length of the specimen. The following table gives the elongation after the various heat treatments:

TABLE

| Heat Treatment | Elongation with 100 grams, in. | Elongation after removal of 100 gram weight, in. | Elongation when 100 gram weight added again, in. | Elongation with 150 grams, in. |
| --- | --- | --- | --- | --- |
| None | 0.0325 | 0.0145 | 0.035 | 0.0525 |
| 100° C. in air for 30 min | 0.020 | 0.010 | 0.0225 | 0.035 |
| 100° C. in nitrogen for 30 min | 0.020 | 0.0075 | 0.020 | 0.035 |

The results of these tests show that heating of the polymer results in a significant decrease in elongation.

For purposes of comparison, the elongation elasticity of the base non-sulfonated non-heat treated polyethylene film used in Example 1 was measured in the same manner as described above.

| | Elongation (inches) |
|---|---|
| On adding 100 g. weight | 0.08 |
| After removing 100 g. weight | 0.00 |
| On replacing 100 g. weight | 0.08 |
| With 150 g. weight | 0.20 |
| With 200 g. weight | 0.55 |
| With 250 g. weight | 1.02 |
| With 300 g. weight | 1.22 and broke |

*Example 2*

A piece of polyethylene film 1.3 mils thick and weighing 0.35 gram was allowed to swell in 100 grams ethylene dichloride at 65° C. for 20 minutes. At the end of this time, 10 grams chlorosulfonic acid was added to make the solution approximately 10 percent by weight in chlorosulfonic acid, heating continued at 67° C. for 10 minutes and then cooling allowed to proceed for 10 minutes. The presence of sulfone groups in the cross-with methylene dichloride, an 11 M hydrochloric acid solution, water, a 10 percent by weight potassium hydroxide solution, water, an 11 M hydrochloric acid solution and then water. The resulting film had an ion exchange capacity of 1.28 milliequivalents per gram (dry H+ form) as measured by titration vs. 0.1 N NaOH. Infrared absorption showed the presence of sulfonic acid groups in the polymer prior to titration and sulfonate groups after titration. One section of this film was heated to a temperature ranging between 200° and 250° C. for 25 minutes. The presence of sulfone groups in the cross-linked polymer was shown by infrared spectroscopy. The film was still structurally stable.

While the foregoing description has been concerned principally with the treatment of polyethylene, it is not intended that the invention be so limited but that it include such treatment of other aliphatic hydrocarbon polymers, such as polypropylene and homopolymers and copolymers of these and other aliphatic olefins.

What is claimed is:

1. Process for preparing a sulfonated hydrocarbon polymer containing sulfone cross-linkages by swelling a solid aliphatic hydrocarbon polymer with a liquid halogenated hydrocarbon swelling agent, sulfonating the swollen polymer with an inorganic sulfur-containing acidic sulfonating agent, recovering a sulfonated polymer having predominately sulfonic acid groups on the polymer chains thereof, and heating at a temperature in the range from about 60° to about 400° C. such sulfonated polymer causing further reaction of some of the sulfonic acid groups and forming sulfone cross-linkages in the resulting product.

2. Process of claim 1 in which the heating step is carried out at a temperature in the range from about 60° to about 400° C. for a time in the range from about one second to about two hours, the time of heating being generally some inverse function of the temperature.

3. Process of claim 1 wherein the solid aliphatic hydrocarbon polymer is sulfonated with a sulfur trioxide-containing sulfonating agent.

4. Process of claim 1 wherein the aliphatic hydrocarbon polymer is polyethylene.

5. Process of claim 1 wherein the solid aliphatic hydrocarbon polymer is polyethylene and the sulfonating agent is chlorosulfonic acid.

6. Process for preparing a sulfonated aliphatic hydrocarbon polymer containing sulfone cross-linkages by swelling a solid aliphatic hydrocarbon polymer with a liquid halogenated hydrocarbon swelling agent, sulfonating the swollen polymer with chlorosulfonic acid, recovering the sulfonated polymer, hydrolyzing any chlorosulfonyl groups in such sulfonated polymer with an aqueous hydrolyzing agent, and heating at a temperature in the range from about 60° to about 400° C. the resulting sulfonated polymer having predominately sulfonic acid groups on the polymer chains thereof causing reaction of some of such sulfonic acid groups and forming sulfone cross-linkages in the resulting product.

7. Process for preparing a sulfonated aliphatic hydrocarbon polymer containing sulfone cross-linkages by swelling a solid aliphatic hydrocarbon polymer with a liquid halogenated hydrocarbon swelling agent, sulfonating the swollen polymer with chlorosulfonic acid, separating the sulfonated polymer from the sulfonating agent, hydrolyzing any chlorosulfonyl groups in such sulfonated polymer with an aqueous alkaline hydrolyzing agent, acidifying the sulfonated polymer, washing the same with water until substantially free of water-soluble materials and recovering a sulfonated polymer having predominately sulfonic acid groups on the polymer chains thereof, and heating such sulfonated polymer at a temperature in the range from about 60° to about 400° C. for a time, generally inverse to the temperature, in the range from about one second to about two hours, causing intermolecular reaction of some of the sulfonic acid groups and forming sulfone cross-linkages in the resulting product.

8. Process of claim 7 wherein the aliphatic hydrocarbon polymer is polyethylene.

9. Process for preparing a sulfonated polyethylene film containing sulfone cross-linkages by swelling a polyethylene film in ethylene dichloride, sulfonating the swollen polyethylene film with chlorosulfonic acid, separating the sulfonated polyethylene film from unreacted chlorosulfonic acid, washing the sulfonated film with water, soaking the sulfonated film in aqueous alkali until any chlorosulfonyl groups in the sulfonated polyethylene are hydrolyzed to sulfonate groups, washing the sulfonated polyethylene film sequentially with water, aqueous acid, and water and recovering a film of sulfonated polyethylene having predominately sulfonic acid groups on the polymer chains thereof, and heating such sulfonated polyethylene film at a temperature in the range from about 60° to about 400° C. for a time, generally inverse to the temperature, in the range from about one second to about two hours, causing intermolecular reaction of some of the sulfonic acid groups and forming sulfone cross-linkages in the resulting film product.

10. A sulfonated solid aliphatic hydrocarbon polymer having sulfone cross-linkages between polymer molecules thereof and prepared by the process of claim 1.

11. A sulfonated polyethylene having sulfone cross-linkages between polymer molecules thereof and prepared by the process of claim 8.

12. A sulfonated polyethylene film having sulfone cross-linkages between polymer molecules thereof and prepared by the process of claim 9.

13. A process according to claim 1 wherein said sulfonated aliphatic hydrocarbon polymer is rinsed with a solution of an alkaline material prior to said heating whereby the sulfonic acid groups of said sulfonated aliphatic hydrocarbon polymer are temporarily tied up by said alkaline material and cross-linking through said sulfonic acid groups during said heating is retarded.

References Cited by the Examiner

UNITED STATES PATENTS

| 2,920,064 | 1/1960 | Baptist et al. | 260—94.9 |
| 3,133,030 | 5/1964 | Wheaton et al. | 260—2.2 |
| 3,158,583 | 11/1964 | Corte et al. | 260—79.3 X |
| 3,206,445 | 9/1965 | Volk | 260—79.3 |

FOREIGN PATENTS 747,948  4/1956  Great Britain.

JOSEPH L. SCHOFER, *Primary Examiner.*

D. K. DENENBERG, *Assistant Examiner.*